US005245621A

United States Patent [19]

Leupold

[11] Patent Number: 5,245,621

[45] Date of Patent: Sep. 14, 1993

[54] PERIODIC PERMANENT MAGNET STRUCTURE FOR ACCELERATING CHARGED PARTICLES

[75] Inventor: Herbert A. Leupold, Eatontown, N.J.

[73] Assignee: The United States of America as represented by the Secretary of the Army, Washington, D.C.

[21] Appl. No.: 928,679

[22] Filed: Aug. 11, 1992

Related U.S. Application Data

[63] Continuation of Ser. No. 425,548, Oct. 23, 1989, abandoned.

[51] Int. Cl.[5] .............................................. H01S 3/00

[52] U.S. Cl. ......................................... 372/37; 372/2; 335/306

[58] Field of Search ............... 335/302, 304, 306, 210; 372/2, 37

[56] References Cited

U.S. PATENT DOCUMENTS

| | | | |
|---|---|---|---|
| 3,822,410 | 7/1974 | Madey | 372/2 |
| 4,530,096 | 7/1985 | Bekefi et al. | 372/37 |
| 4,542,510 | 9/1985 | Black | 372/2 |
| 4,831,351 | 5/1989 | Leupold et al. | 335/306 |

*Primary Examiner*—Georgia Y. Epps
*Attorney, Agent, or Firm*—Michael Zelenka; John M. O'Meara

[57] ABSTRACT

HSFS's or magic spheres are adapted for use in periodic permanent magnet structures to derive magnetic fields of greater uniformity and average magnitude perpendicularly across an axis along which charged particles are directed in devices, such as radiation sources.

7 Claims, 3 Drawing Sheets

PERIODIC PERMANENT MAGNET STRUCTURE FOR ACCELERATING CHARGED PARTICLES

The invention described herein may be manufactured, used, and licensed by or for the Government for governmental purposes without the payment to me of any royalties thereon.

This is a continuation of co-pending application Ser. No. 07/425,548 filed on Oct. 23, 1989, now abandoned.

BACKGROUND OF THE INVENTION

The present invention relates generally to permanent magnet structures and more particularly, to periodic permanent magnet (hereinafter PPM) structures which provides transverse fields for accelerating charged particles, such as in radiation sources.

PPM structures for accelerating charged particles are well known in the art. A beam of charged particles is directed along an axis and the PPM structure is disposed to present a sequence of magnetic fields along that axis and in successively opposite directions perpendicularly thereacross. Various kinds and arrangements of permanent magnets have been utilized in such PPM structures, however, efforts to reduce the weight and/or volume thereof continue to command much research and development attention. A primary focus of these efforts is to optimize the field strength to mass ratio for the magnetic material utilized in such PPM structures and it is to this optimization that the present invention is directed.

SUMMARY OF THE INVENTION

It is the general object of the present invention to enhance the field strength to mass ratio of PPM structures which provide transverse fields for accelerating charged particles.

It is a specific object of the present invention to accomplish the above-stated general object in a coherent radiation source.

These and other objects are accomplished in accordance with the present invention by aligning a plurality of juxtaposed magic spheres or hollow spherical flux sources (hereinafter HSFS) along an axis and passing a bore hole therethrough which provides for charged particles to be directed along that axis. Each HSFS is oriented about the axis to pass its magnetic field perpendicularly thereacross, while successive HSFS's are oriented to pass their magnetic fields in opposite directions thereacross. The period between the magnetic fields in each direction across the axis is precisely fixed to establish the necessary phase relationship with the charged particles when a coherent radiation source is desired.

The scope of the present invention is only limited by the appended claims for which support is predicated on the preferred embodiments hereinafter set forth in the following description and the attached drawings wherein like reference characters relate to like parts throughout the several figures.

DESCRIPTION OF THE PREFERRED EMBODIMENTS

Figure 1:
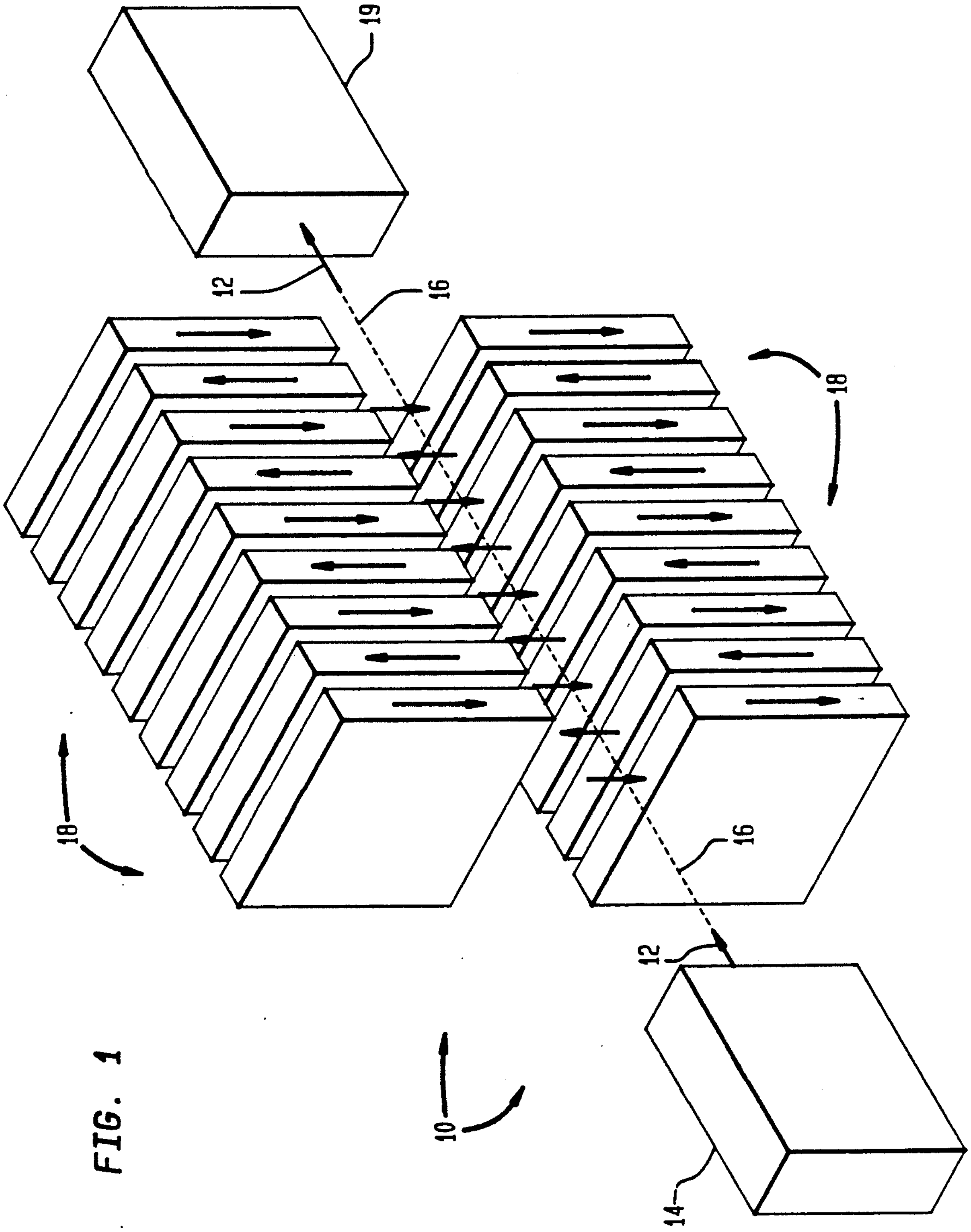
FIG. 1 is an isometric view of a block diagram wherein a prior art PPM structure is disposed within a conventional arrangement for accelerating charged particles.

A conventional arrangement for accelerating charged particles, such as a radiation source 10, is illustrated in FIG. 1. In this arrangement a beam 12 of charged particles is generated by a conventional source 14, such as an electron gun, and passes therefrom in an evacuated guide (not shown) along an axis 16 through a PPM structure 18, to a conventional sink 19. The PPM structure 18 presents a sequence of magnetic fields (represented by vertically up and down arrowheads) along the axis 16 in alternately or successively opposite directions perpendicularly thereacross. As the charged particles pass through each magnetic field, they are accelerated in accordance with the direction of that field and therefore, radiate energy along the axis 16 in the direction of the beam 12.

For the velocities attained by the charged particles, the magnitude of energy radiated is directly proportional to the square of the magnitude at which the charged particles are accelerated. At any location along the axis 16, the acceleration imparted to the charged particles is proportional to the magnetic field magnitude presented thereat by the PPM structure 18. Therefore, along the total length of the axis 16 within the PPM structure 18, the average rate of energy radiated by the charged particles is proportional to the square of the average magnetic field magnitude presented therealong by the PPM structure 18. Consequently, performance of the radiation source 10 can be greatly enhanced by maintaining a high magnetic field magnitude uniformly along the axis 16 in the PPM structure 18, without seriously increasing the weight and/or volume of the PPM structure 18, or seriously distorting the overall configuration thereof.

Primarily because of flux leakage between the adjacently disposed magnetic fields therein, prior art PPM structures 18 provide magnetic field profiles that have substantially sinusoidal wave patterns along the axis 16. The PPM structures 18' of the present invention utilize a permanent magnet configuration known as the magic sphere to provide magnetic field profiles that have substantially square wave patterns along the axis 16. Those skilled in the art of transverse type PPM structures will understand without any further explanation that the square wave profile presents a greater average magnetic field magnitude along the axis 16 than does the sinusoidal wave profile, assuming the same peak magnitude for both profiles. Furthermore, because the magnetic fields are transverse to the travel of the charged particles through such PPM structures 18, the rate of energy radiated by the charged particles therein is proportional to the square of the average magnetic field magnitude encountered. Of course, this average magnetic field magnitude is much greater for the square wave profile than for the sinusoidal wave profile.

A magic sphere or HSFS is a hollow flux source of spherical configuration, which produces a permanent magnetic field within a centrally located cavity therein. Furthermore, the peak magnitude of the magnetic field per weight and/or volume of magnetic material is at least as great, while the uniformity of the magnetic field is much greater in the magic sphere cavity than in other configuration of permanent magnet flux sources, as disclosed in U.S. Pat. No. 4,837,542 issued Jun. 6, 1989 to Herbert A. Leupold, the present applicant. Accordingly, the effective field strength to mass ratio attained with the magic spheres in the PPM structures 18' of the invention is higher than any other configuration of permanent magnet flux sources. As also disclosed in the above-mentioned patent, the magnetization of the material in a magic sphere is azimuthally symmetrical.

Figure 2:
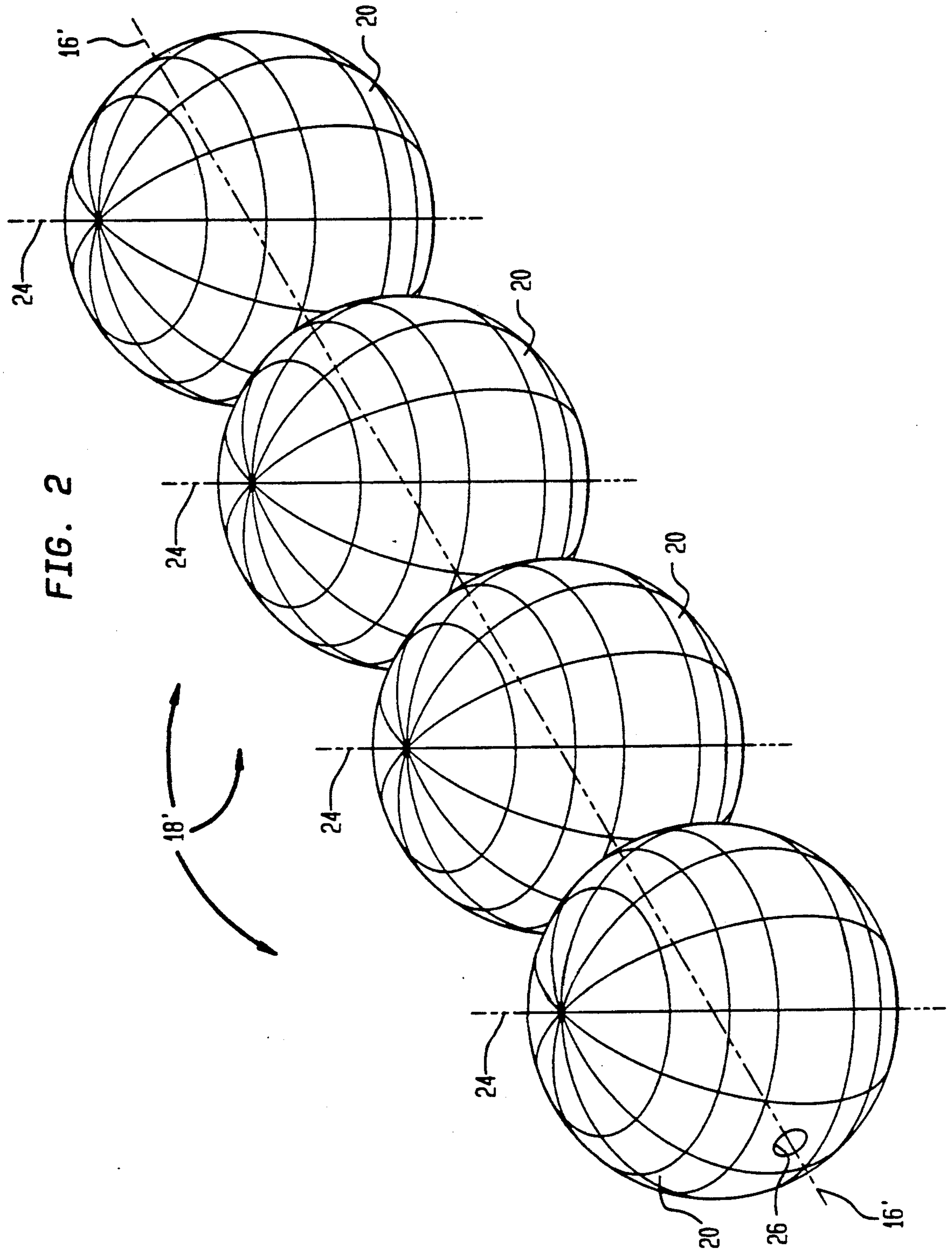
FIG. 2 is an isometric view of a PPM structure in accordance with the preferred embodiments of the invention.
Figure 3:
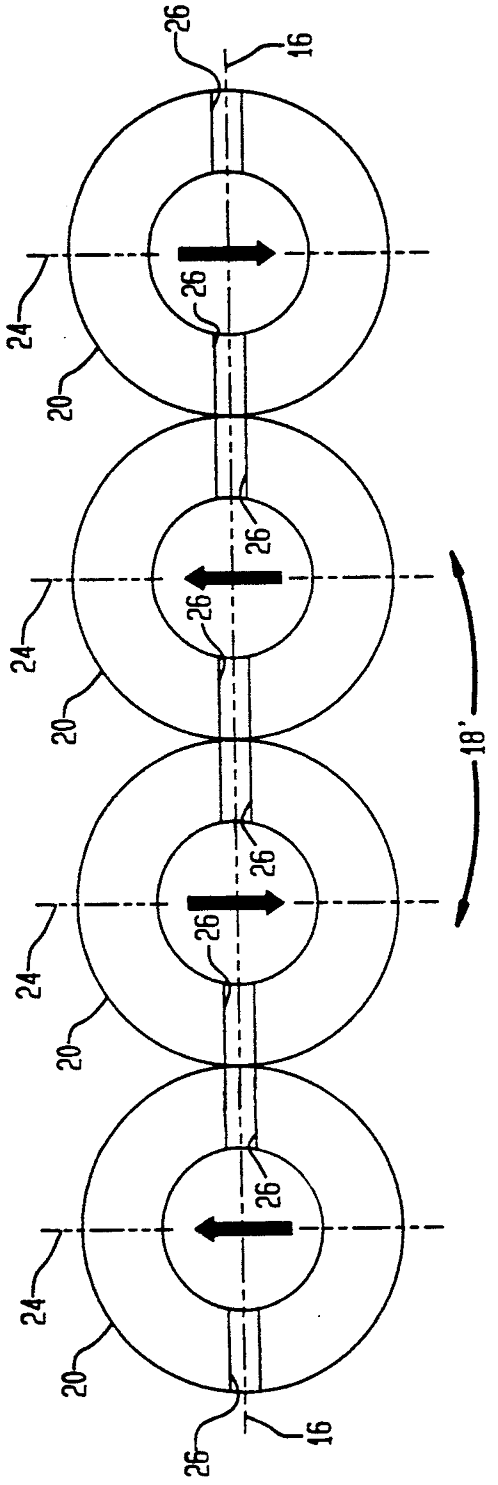
FIG. 3 is a cross-sectional view of the FIG. 2 PPM structure, showing the orientation of the magnetic fields therein.

In accordance with the transverse type PPM structure 18' of the present invention, FIG. 2 shows a sequence of four magic spheres or HSFS's 20 that are juxtaposed or located tangent to each other in pearl string fashion on an axis 16' along which charged particles are to be directed in an evacuated guide (not shown). An axis 24 through the magnetic poles of each magic sphere 20 is aligned perpendicularly across the axis 16' and bore holes 26 are disposed through the wall thickness of each magic sphere 20 along the axis 16'. These bore holes 20 cooperate with the cavities in the spheres 20 to provide for a continuous channel through the PPM structure 18', which accomodates the evacuated guide. Furthermore, as shown in FIG. 3 the magnetic fields of alternate or successive magic spheres 20 are oriented in opposite directions across the axis 16'. It is to be understood that the present invention is in no way limited to any particular number of magic spheres 20 in the PPM structure 18'. The number of magic spheres 20 actually utilized in the PPM structure 18' of the invention is only determined by the nature of the charged particle accelerating arrangement in which it is disposed.

Figure 4:
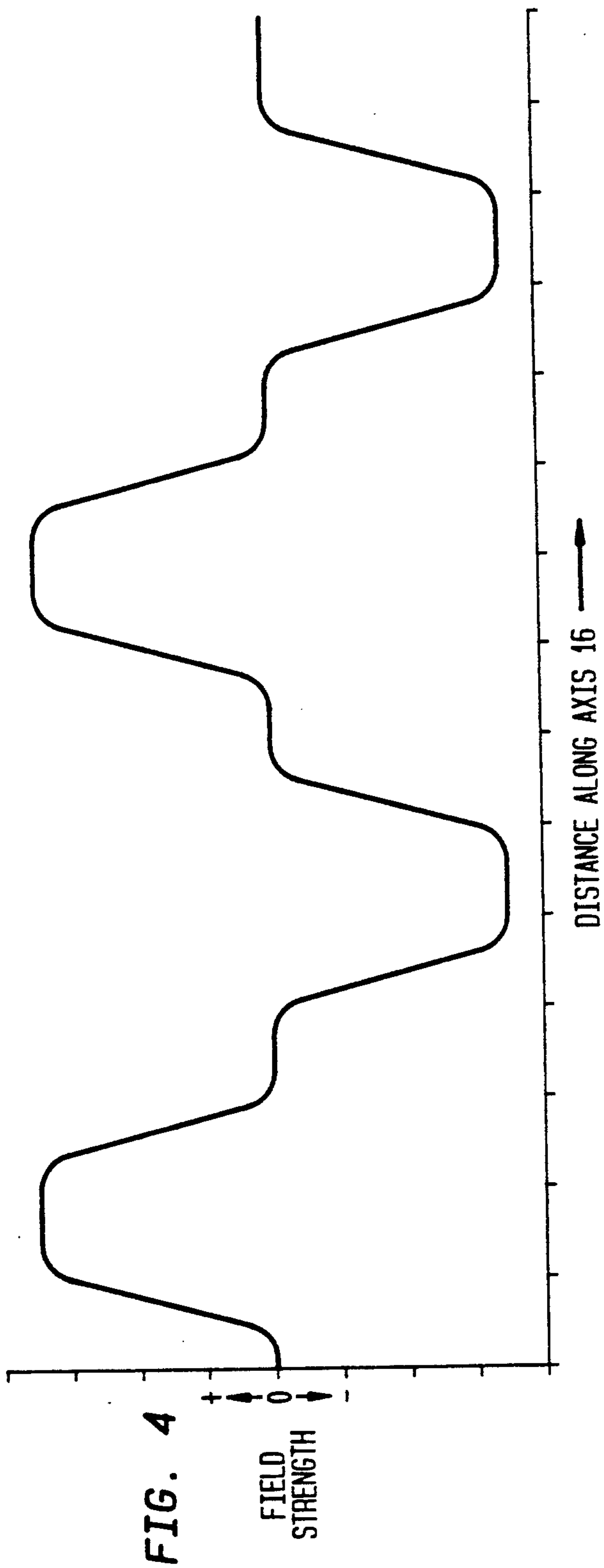
FIG. 4 is the magnetic field profile for the PPM structure of FIGS. 2 and 3.

The magnetic field profile for the transverse type PPM structure 18' of FIGS. 2 and 3 is illustrated in FIG. 4. This profile represents the strength of the magnetic field that will be encountered by the charged particles as they pass along the axis 16' of the PPM structure 18', such as in the radiation source 10. As stated previously, the magnetic field is substantially uniform or constant within the hollow cavities of each magic sphere 20. However, the magnetic field is almost zero in the bore holes 26 which pass through each magic sphere 20 in the PPM structure 18'. Consequently, very little force is exerted on the charged particles in the bore holes 26 and therefore, they experience very little acceleration therein. However, when the charged particles enter each magic sphere cavity, a substantially uniform force is exerted thereon and they encounter an acceleration in accordance with the magnitude of that force. Of course, the direction of such acceleration is perpendicular to both axis 16' and the magnetic field direction of each magic sphere 20.

As shown in FIGS. 2 and 3 the magnetic fields of the magic spheres 20 are separated along the axis 16' by fixed distance or period. Those skilled in the art of radiation sources will understand that the magic spheres 20 can be sized to precisely set this fixed period in accordance with the velocity of the charged particles and thereby derive coherent radiation at some fundamental frequency. A relativistic period equal to the speed of light divided by the desired fundamental frequency of the coherent radiation would first be determined. Then the magnitude of the fixed period would be found as the result of multiplying the relativistic period by gamma. Of course, gamma is found from dividing one by the square root of one minus the squared value of the charged particle velocity over the velocity of light. Furthermore, the value of the field density in the magic spheres 20 in Tesla multiplied by the fixed period in centimeters must be held equal to or less than one.

Those skilled in the art will appreciate without any further explanation that, within the concept of this invention, many modifications and variations are possible to the above disclosed embodiments of the periodic permanent magnet structure. Consequently, it should be understood that all such modifications and variations fall within the scope of the following claims.

What I claim is:

1. In a periodic permanent magnet structure of the type for accelerating charged particles transversely across an axis along which such particles are directed through said magnet structure, the improvement comprising:

a plurality of hollow spherical flux sources juxtaposed along said axis, each said flux source enclosing a uniform magnetic field within a central cavity thereof, each said uniform magnetic field presenting a square wave profile along said axis to enhance the average magnetic field magnitude attained therealong, said flux sources being oriented about said axis to pass said magnetic fields successively in opposite perpendicular directions across said axis, and bore holes extend through the wall thickness of each said flux source for cooperating with said central cavities to pass the charged particles along said axis.

2. The magnet structure of claim 1 wherein the period of said successive magnetic fields along said axis is precisely fixed in accordance with the velocity of the charged particles to derive coherent radiation.

3. A periodic permanent magnet structure for a radiation source, comprising:

a plurality of hollow spherical flux sources juxtaposed along an axis with a channel extending continuously therethrough along said axis, each said flux source enclosing a uniform magnetic field within a central cavity thereof, each said uniform magnetic field presenting a square wave profile along said axis to enhance the average magnetic field magnitude attained therealong, and said magnetic fields being successively oriented in opposite direction perpendicularly across said axis.

4. The magnet structure of claim 3 wherein charged particles are directed through said magnet structure along said axis and the period of said successive magnetic fields along said axis is precisely fixed in accordance with the velocity of the charged particles to derive coherent radiation.

5. In a radiation source of the type having charged particles directed along an axis through an evacuated guide and a periodic permanent magnet structure disposed about that guide for accelerating the charged particles transversely across said axis, the improvement comprising:

said periodic permanent magnet structure having a plurality of hollow spherical flux sources juxtaposed along said axis, each said flux source enclosing a uniform magnetic field within a central cavity thereof, each said uniform magnetic field preventing a square wave profile along said axis to enhance the average magnetic field magnitude attained therealong, said magnetic fields being successively oriented in opposite directions perpendicularly across said axis, and a channel extends continuously along said axis through said flux sources to accommodate the evacuated guide.

6. The radiation source of claim 5 wherein the period of said successive magnetic fields along said axis is precisely fixed in accordance with the velocity of the charged particles to derive coherent radiation.

7. The radiation source of claim 5 wherein an electron gun directs charged particles along said axis.

* * * * *